US008307296B2

(12) United States Patent
Mackinlay et al.

(10) Patent No.: US 8,307,296 B2
(45) Date of Patent: Nov. 6, 2012

(54) SYSTEMS AND METHODS FOR EFFECTIVE ATTENTION SHIFTING

(75) Inventors: Jock D. Mackinlay, Palo Alto, CA (US); Stuart K. Card, Los Altos, CA (US)

(73) Assignee: Palo Alto Research Center, Incorporated, Palo Alto, CA (US)

( * ) Notice: Subject to any disclaimer, the term of this patent is extended or adjusted under 35 U.S.C. 154(b) by 2946 days.

(21) Appl. No.: 10/687,486

(22) Filed: Oct. 17, 2003

(65) Prior Publication Data

US 2005/0086610 A1 Apr. 21, 2005

(51) Int. Cl.
*G06F 3/048* (2006.01)
*G06F 17/00* (2006.01)
(52) U.S. Cl. ........................ 715/767; 715/212
(58) Field of Classification Search .................. 715/767, 715/212
See application file for complete search history.

(56) References Cited

U.S. PATENT DOCUMENTS

| 4,783,648 | A * | 11/1988 | Homma et al. ............... 715/794 |
| 6,185,582 | B1 | 2/2001 | Zellweger et al. |
| 6,256,649 | B1 | 7/2001 | Mackinlay et al. |
| 2002/0080302 | A1 | 6/2002 | Dubin et al. |
| 2002/0085278 | A1 | 7/2002 | Kolosowsky |

OTHER PUBLICATIONS

User's Guide Microsoft Excel Version 5.0 1993-1994 pp. 666-674.*
Jonathan Grudin Partitioning Digital Worlds: Focal and Peripheral Awareness in Multiple Monitor Use SIGCHI'01 Mar. 31-Apr. 4, 2001 vol. 3 Issue 1 pp. 458-465.*

Desney S. Tan and Mary Czerwinski Effects of visual Separation and Physical Discontinuities when Distributing Information across Multiple Displays Human-Computer Interaction INTERACT 03 IOS Press pp. 252-255, Copyright IFIP, 2003.*
Applied Science Laboratories Model 501 and Model 504 Eye Tracking System Product Specifications, printed Sep. 24, 2003.
Chang, B. W. et al., "Animation: From Cartoon to the User Interface", in Proceedings of the Sixth Annual Symposium on User Interface Software and Technology, Atlanta, GA, p. 45-55,1993.
Czerwinski, M. et al., "Women Take a Wider View", Proceedings of the SIGCHI Conference on Human Factors in Computing Systems: changing our Wworld, changing ourselves, Apr. 2002.
Gaver, W. et al., "Effective Sounds in Complex Systems: The Arkola Simulation", in Proceedings of the SIGCHI Conference on Human Factors in Computing Systems: Reaching through Technology, Mar. 1991.

(Continued)

*Primary Examiner* — William Bashore
*Assistant Examiner* — Andrea Long
(74) *Attorney, Agent, or Firm* — Oliff & Berridge, PLC

(57) ABSTRACT

Techniques are provided to improve communication through selective display of attention shifting display elements. A focus of attention is determined, display events located and attention shifting display elements displayed. The attention shifting display elements suggest display events as candidate foci of attention based on the display event, the display event location and the distance from the focus of attention. Attention shifting display elements are composed of attention directing portions, and optional attention attracting and informing portions. The attention directing portions help direct attention across distances and help attract attention to a point. The informing portions indicate availability of information associated with the display event occurring outside the focus of attention. The attention directing, attention attracting and informing portions of an attention shifting display element are associated with dynamic or periphery of attention based display attributes, static or focus of attention based display attributes or a combination of the two.

44 Claims, 12 Drawing Sheets

OTHER PUBLICATIONS

Henderson, D. et al., "Rooms: The Use of Multiple Virtual Workspaces to Reduce Space Contention in a Window-Based Graphical User Interface", ACM Transactions on Graphics (TOG) Jul. 1986.

Igarashi, T. et al., "Fluid Visualization of Spreadsheet Structures", IEEE Symposium on Visual Languages, p. 118-125, Halifax, Nova Scotia, Canada, Sep. 1998.

Panko, R., "What We Know About Spreadsheet Errors", Journal of End User Computing's Special Issue on Scaling Up End User's Development, p. 15-21, vol. 10, No. 2. Spring 1998.

Tan, D. et al., "Effects of Visual Separation and Physical Discontinuities when Distributing Information Across Multiple Displays", In M. Rauterberg et al. (Eds.), Human-Computer Interaction—INTERACT '03, IOS Press, 252-255. Copyright IFIP, 2003.

Baudisch, P. et al. "Drag-and-Pop and Drag-and-Pick: techniques for accessing remote screen content on touch- and pen-operated systems", in Jun Rekimoto and Masanori Saitoh, "Augmented Surfaces: A Spatially Continuous Workspace for Hybrid Computing Environments", Proceedings of CHI'99, pp. 378-385, 1999.

Bartram, L. R., "Enhancing Information Visualization with Motion", Thesis, Simon Fraser University, Jun. 2001.

Zellweger, Polle T. et al. "Reading and Writing Fluid Hypertext Narratives." *HT'02*, College Park, Maryland. pp. 45-54. Jun. 11-15, 2002.

Czerwinski, Mary et al. "Toward Characterizing the Productivity Benefits of Very Large Displays." *Human-Computer Interaction—INTERACT '03*. IOS Press, IFIP. pp. 9-16, 2003.

* cited by examiner

SYSTEMS AND METHODS FOR EFFECTIVE ATTENTION SHIFTING

INCORPORATION BY REFERENCE

This Application incorporates by reference:
U.S. patent application Ser. No. 10/687,486, entitled "Systems and Methods for Managing Seams" by Mackinlay et al., filed Oct. 17, 2003;
U.S. Pat. No. 6,256,649 entitled "Animated Spreadsheet for Dynamic Display of Constraint Graphs" by Mackinlay et al., filed Jun. 17, 1998; and
U.S. Pat. No. 6,185,582, entitled "Spreadsheet View Enhancement System" by Zellweger et al., filed Jun. 17, 1998; each in their entirety.

BACKGROUND OF THE INVENTION

1. Field of Invention
This invention relates to shifting attention effectively.
2. Description of Related Art
Early display systems were of limited size and resolution. Thus, early display systems fit easily within the focus of attention. Later display systems, added overlapping windows to augment the limited bandwidth of the focus of attention based communication channel. However, these conventional methods of displaying additional information in overlapping windows were limited by the small physical size of the display systems. Emerging windowing models were then affected by the overlap of the focus of attention and the small display size. Moreover, current conventional windowing models do not have a mechanism and/or model to effectively manage access to the focus of attention. Conventional windowing models do not differentiate between display events presented at the focus of attention, at the periphery of attention, and outside of the visual field. Although conventional overlapping windows and other attention re-focusing user interface elements were developed to augment the limited bandwidth of the focus of attention based communication channel, conventional user interface elements merely serve to distract attention and/or force a re-focusing of attention based on a system determination of relevance. Thus, these conventional user interface elements do not shift attention effectively.

Modern displays such as wideband display systems may include portions of the display space that extend into the periphery of attention. Since conventional windowing models do not manage the focus of attention, modern display systems incorporating these conventional models also lack an appropriate model for managing display space outside of the focus of attention.

Information displayed at the periphery of attention may be sampled or browsed using quick, 50-200 milliseconds, saccadic eye movements. Information displayed just beyond the visual field may be sampled or browsed with quick, 300-600 millisecond, head and eye movements. However, conventional windowing models do not integrate the information provided by peripheral display events since no context is provided to inform the user of the relative importance. Moreover, when the system displays information in the middle of the user work area, cognitive thrashing is induced as the user is forced to attend to tasks based on system determinations of importance.

SUMMARY OF THE INVENTION

Thus, systems and methods that efficiently inform the user of contextually relevant information available at, and beyond, the periphery of attention would be useful. The systems and methods of this invention provide for effectively shifting attention to display events outside of the focus of attention, at the periphery of attention. Display events and a focus of attention are determined. Attention shifting display elements associated with the display events are determined based on the location of the display events within the perceptual field. Display events located at the periphery of attention are associated with peripheral perceptual field attention attracting display attributes. Display events located at the focus of attention are associated with focus of attention based attention attracting display attributes.

The various systems and methods according to this invention may also be used to provide context within the focus of attention for display events. Information portions of the attention shifting display elements are displayed within the focus of attention. The information portions of the attention shifting display elements provide context within the current focus of attention. The context facilitates sampling or browsing of peripheral and/or out-of-perceptual-field information associated with the attention shifting display elements.

DETAILED DESCRIPTION OF EXEMPLARY EMBODIMENTS

Figure 1:
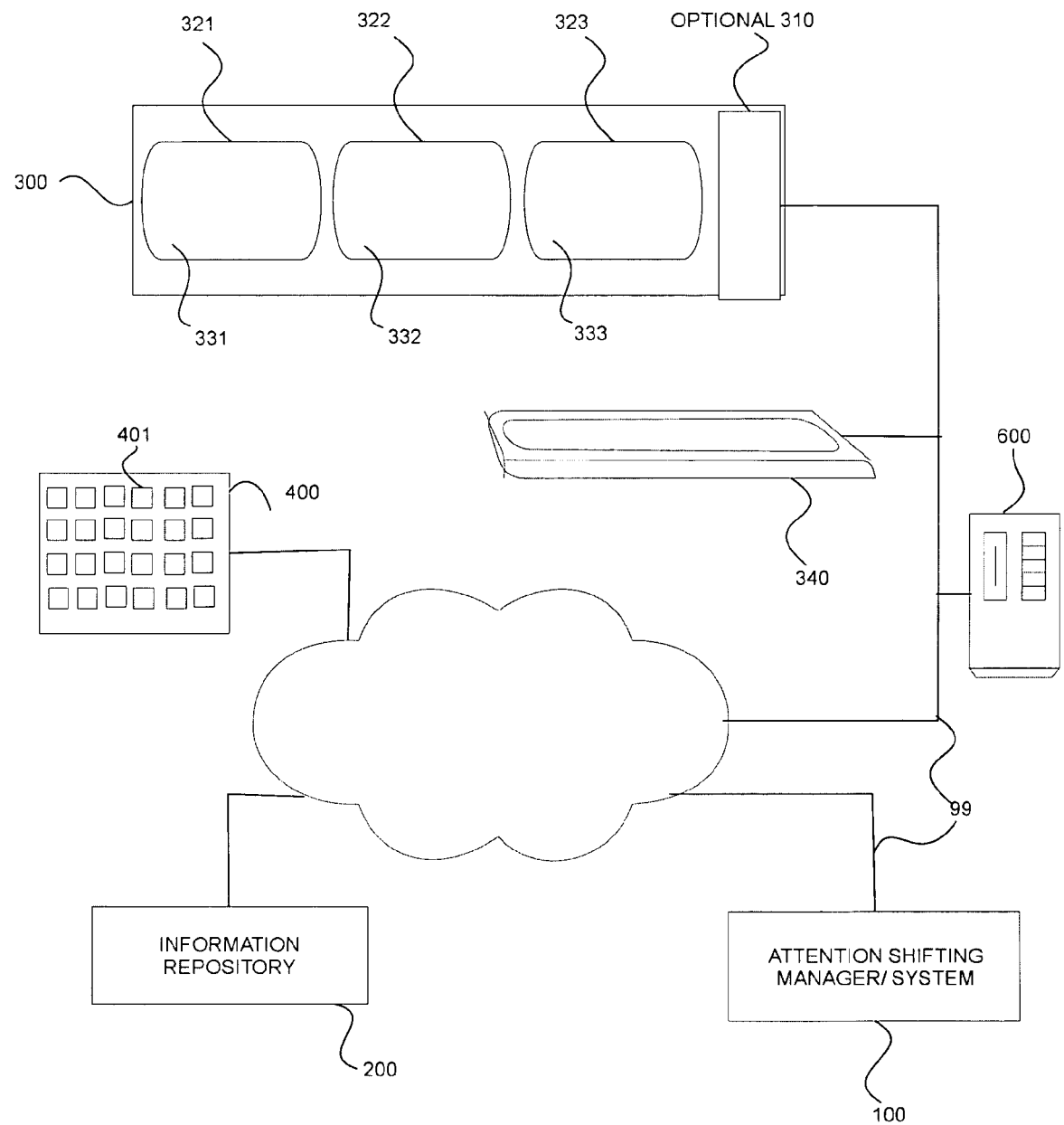
FIG. 1 is an overview of first and second exemplary embodiments of an attention shifting manager or system according to this invention.

FIG. 1 is an overview of first and second exemplary embodiments of an attention shifting manager or system 100 according to this invention. In a first exemplary embodiment according to this invention, documents, spreadsheets or other information from the information repository 200 are displayed on an e-paper based wideband display 300 or a dynamic Braille display 400. The information repository 200 may be a web server, a digital library or any other known or later developed source of information. The information repository may serve documents encoded in HTML, XML, WML, Microsoft Word,® Microsoft Excel,® Adobe PDF,® or any other known or later developed format.

The exemplary e-paper based wideband display 300 is comprised of discrete displays 321-323, an input device 340 and an optional e-paper wideband display controller 310. The e-paper wideband display controller 310 mitigates the effect of the seams or non-sensible areas that occur between the discrete displays 321-323 and coordinates input from the keyboard input device 340. The e-paper based wideband display 300 is connectable via communications links 99 to the attention shifting manager or system 100.

In various exemplary embodiments according to this invention, a user of the e-paper based wideband display 300 requests the display of information from a spreadsheet stored in the information repository 200. The large size of the wideband display allows more of the user's current information needs to be simultaneously displayed. However, in some cases, due to the large size of the wideband display and/or the large quantity of information to be displayed, it may not be possible to display all of the information within the focus of attention. Thus, the attention shifting manager or system 100 mediates access to the focus of attention. The attention shifting manager or system 100 determines the current focus of attention and the location of any active display events vying for attention. The distance between the active display event and the focus of attention is determined. An attention shifting display element is then determined based on the active display event and the determined distance.

Various other exemplary embodiments according to this invention, allow user actions to dynamically determine the attention shifting display elements. For example, if the focus of attention remains fixed on the active display event for a time that exceeds a threshold dwell time, a static or combined static and dynamic attention shifting display element is displayed. The focus of attention may be determined based on the click of the mouse in the cell of a spreadsheet, the position of the cursor within a document, using head and/or eye tracking techniques or any method of determining the focus of attention. The static attention shifting display element informs the user of relevant information without forcing a re-focusing of attention from the current task. Thus, the attention shifting display element communicates information to the user with low cognitive overhead and improves the speed of communication.

In various other exemplary embodiments according to this invention, multiple dwell timers may be associated with mouse-down or any other user event. Different information may be displayed by the attention shifting display elements based on which dwell timer threshold has been exceeded, how many times a user event and/or combination of user events has occurred in a sequence and the like. For example, animated attention shifting display elements illustrating an overview of the constraint graph are displayed when a mouse-down event in a spreadsheet cell exceeds a first time interval. A second, more detailed animated attention shifting display element associated with exceeding a second dwell time illustrates the spreadsheet cell inputs followed by spreadsheet cell outputs. It should be apparent however, that any number of static and/or static and dynamic attention shifting display elements may be displayed based on any number of discrete and/or sequences of user events without departing from the scope of this invention.

If the user indicates continued interest in a portion of the wideband display, an attention shifting display element is displayed. For example, in a visual environment, a visual focus of attention generally corresponds to the foveal area of the eye. The visual periphery of attention generally corresponds to peripheral vision. Foveal and peripheral vision are each associated with different characteristics or attributes. Foveal vision is sensitive to color and detail while peripheral vision is sensitive to motion.

To reduce cognitive overhead and improve the speed of communication, display events are determined and the attention shifting display elements appropriate to the location of the display event within a perceptual field are displayed. In various exemplary embodiments according to this invention, when and/or if the display event becomes the focus of attention, a static attention shifting display element is displayed. For example, using fluid spreadsheets, the underlying inter-relationships between cells in the spreadsheet are displayed using animations. When a spreadsheet cell is selected, an animated dynamic attention shifting display element is displayed to illustrate the constraint graph of the selected cell. If the focus of attention remains fixed on the selected cell and/or the dynamic attention shifting element, for longer than a threshold time interval, a static attention shifting display element is displayed. The static attention shifting display element allows the visualized inter-relationships or constraint graphs to be studied in more detail. It will be apparent that user events such as mouse clicks and the like may also be used to trigger the display of static and/or combined static and dynamic attention shifting display elements.

The static attention shifting display element may also be used to fuse long animation paths in wideband display systems. In order to minimize intrusiveness, visual animations should complete in less than a second. This time limit presents few problems on conventional displays since the animation path is typically only a few centimeters long and lies completely within the focus of attention. However, in a wideband display environment, the animation path may be several hundred centimeters or more. These long animation paths traverse the focus of attention into the periphery of attention and may extend beyond the visual field. To allow these faster animations to be oriented across large distances, a static attention shifting display element overlaps the dynamic attention shifting display elements. The combined static and dynamic attention shifting display elements orient the user to the path of the quickly flowing animations. In various exemplary embodiments according to this invention, the static attention shifting display element may be placed behind, across or in any other location that helps to fuse the animation path.

The dynamic Braille display 400 is comprised of one or more rows of dynamic Braille elements 401. In various exemplary embodiments according to this invention, the Braille elements 401 are composed of addressable pins that can be extended through a plate to indicate different portions of a character, picture element and the like. The Braille elements 401 within the tactile focus of attention include the area beneath a reading fingertip. The reading fingertip is brushed across the rows of Braille elements 401. Other fingertips brushed across other portions of the dynamic Braille display 400 form a tactile periphery of attention. As discussed above, the attention shifting manager or system 100 then determines attention shifting display elements based on the location of a display event and the focus of attention. Display events located at the periphery of attention are associated with attention shifting display elements based on the physical response characteristics of the periphery of attention. Display events at or near the focus of attention are associated with attention shifting display elements based on the physical response characteristics of the focus of attention.

Figure 2:
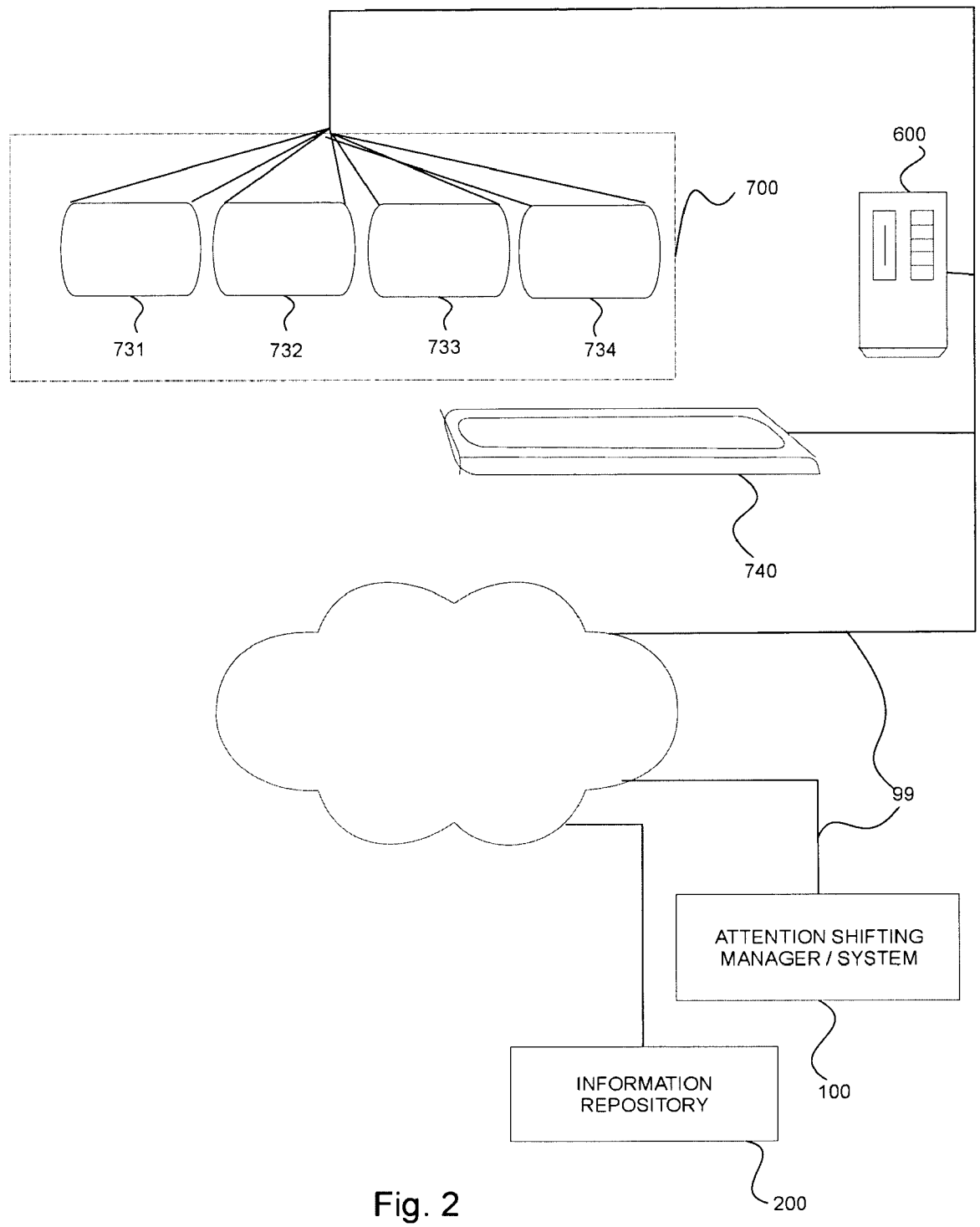
FIG. 2 is an overview of a third exemplary embodiment of an attention shifting manager or system according to this invention.

FIG. 2 is an overview of a third exemplary embodiment of an attention shifting manager or system 100 according to this invention. In the third exemplary embodiment according to this invention, a projector based wideband display 700 is comprised of projector display devices 710, 712 and 714. The projector based wideband display 700 is connectable via communications links 99 to the attention shifting manager or system 100.

The projector based wideband display 700 is comprised of first, second, third and fourth projected display areas 731-734 each separated by a non-sensible area. The projected display areas 731-734 are connectable to keyboard 740, a personal computer 600, an attention shifting manager or system 100 and an information repository 200. A user of the projection based wideband display 700 requests the display of information relevant to the current task. The information may include spreadsheets, documents, information visualizations or any other known or later developed type of information. The large size of the projector based wideband display allows the display of much of the requested information. The focus of attention is determined and the location of each display event is compared to the current focus of attention by the attention shifting manager or system 100. Attention shifting display elements are determined based on the focus of attention and the location of the display event. In this way, the user is also efficiently informed of additional information at or beyond the periphery of attention by attention shifting display elements based on the physical response characteristics of the focus of attention and the periphery of attention.

Figure 3:
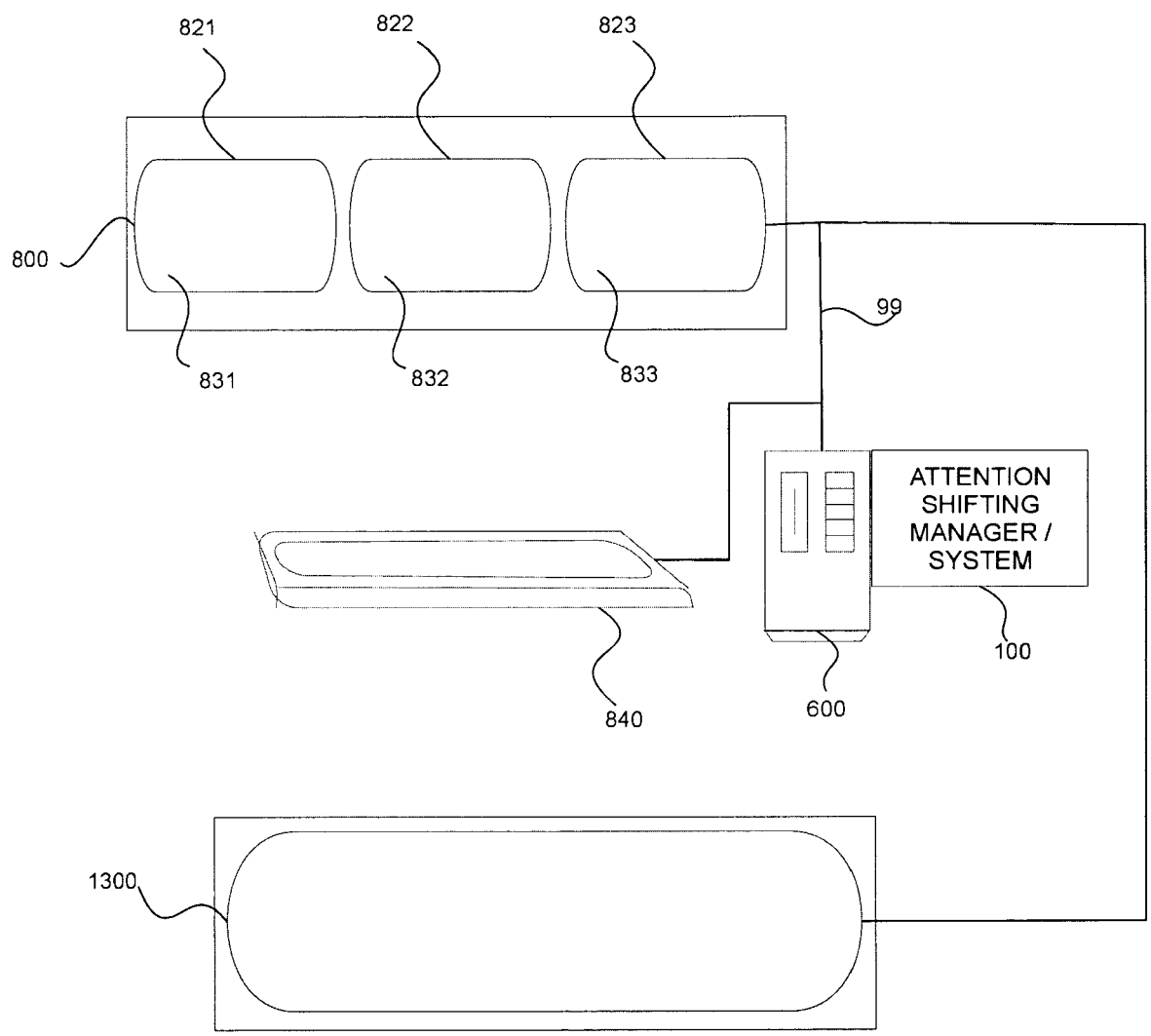
FIG. 3 is an overview of fourth and fifth exemplary embodiments of an attention shifting manager or system according to this invention.

FIG. 3 is an overview of fourth and fifth exemplary embodiments of an attention shifting manager or system 100 according to this invention. In a fourth exemplary embodiment, the multi-monitor based wideband display 800 is comprised of first, second and third display areas 831-833 separated by non-sensible areas.

The multi-monitor based wideband display 800 is connectable via communications links 99 to a keyboard 840 and a personal computer 600 containing an attention shifting manager or system 100. A user of the personal computer 600 requests the display of information relevant to the completing a task. The task related information may be drawn from one or more applications such as database systems, document viewers, visualization systems and the like. In various exemplary embodiments according to this invention, application windows span multiple displays and may well extend past the periphery of attention. An attention shifting display element for a display event is determined based on the physical response characteristics of the focus of attention and the location of the display event.

In a fifth exemplary embodiment according to this invention, a wideband liquid crystal display 1300 is connectable via communications links 99 to the personal computer 600 containing an attention shifting manager or system 100. A user of the personal computer 600 requests the display of task information on the wideband liquid crystal display 1300. The large size of the liquid crystal display is larger than the user's focus of attention. Thus, access to the user's attention is mediated by the attention shifting manager or system 100.

Figure 4:
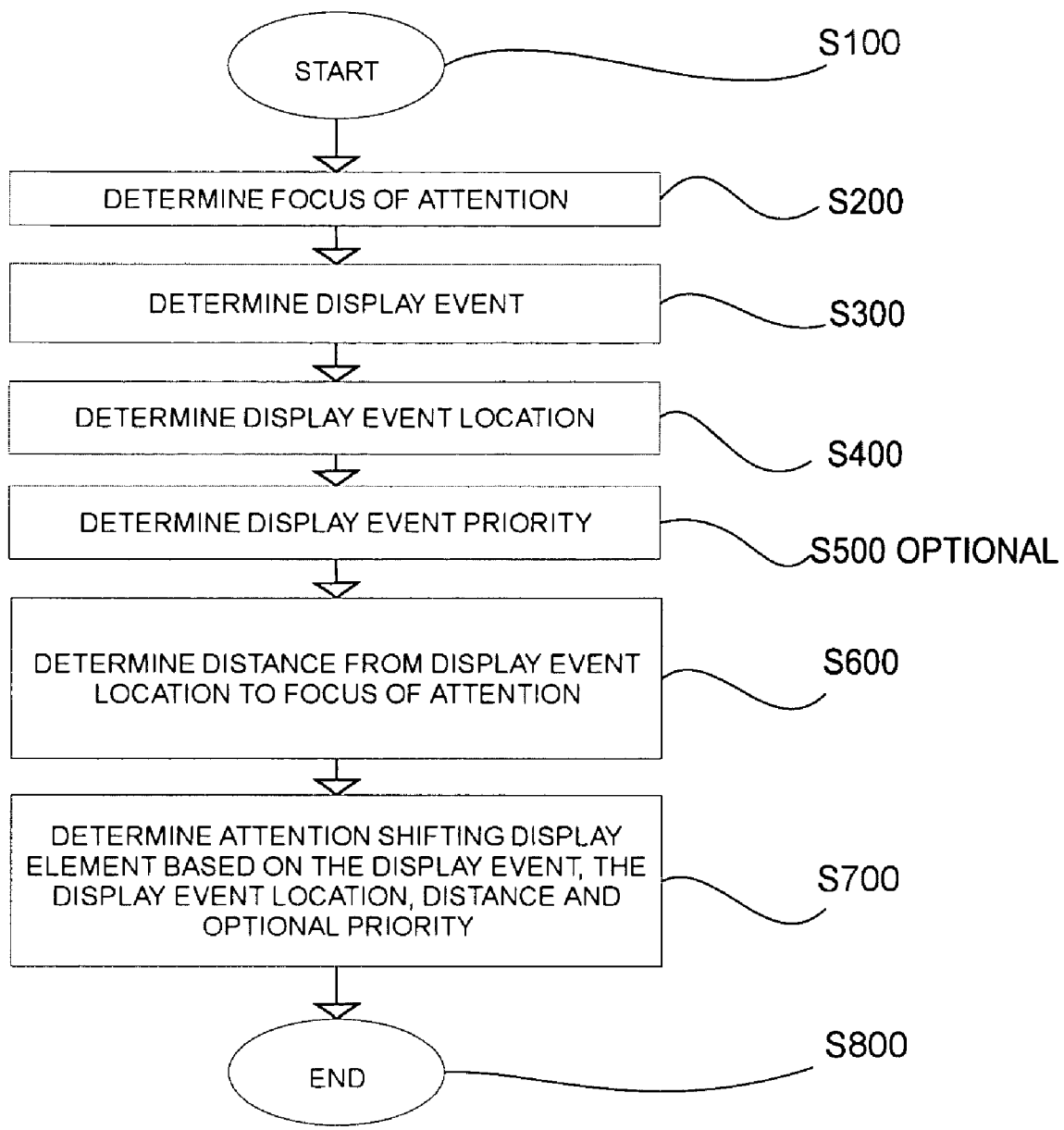
FIG. 4 is a flowchart of a first exemplary method of attention shifting according to this invention.

FIG. 4 is a flowchart of a first exemplary method of attention shifting according to this invention. The process begins at step S100 and immediately continues to step S200.

In step S200, the focus of attention is determined. The focus of attention is determined based on eye tracking, head tracking, gesture tracking or any known or later developed method of determining the focus of attention. For example, a user selection of a word or a cursor movement in a document may be used to infer a focus of attention directed at the word or cursor movement. Eye and/or head tracking systems such as Applied Science Laboratories Model 501 eye tracking system, SensorMatic Instruments 3D VOG system and/or any known or later developed eye and/or head tracking system may be used to track the center of the visual field. Since the user will tend to focus the fovea on objects under consideration, the visual focus of attention may be inferred by tracking eye or pupil movement. The visual focus of attention is associated with the central or foveal portion of the eye which has high visual acuity and color sensitivity. In contrast, the visual periphery of attention, associated with peripheral vision, is sensitive to motion but has less visual acuity and is less sensitive to color. In various other exemplary embodiments according to this invention, aural, tactile and/or other senses, either singly or in combination, are similarly tracked and used to determine a focus of attention.

Thus, for users of a dynamic Braille display, a reading fingertip placed over a first portion of a dynamic Braille display is associated with a tactile focus of attention. Other fingertips placed over other portions of the dynamic Braille display are associated with the tactile periphery of attention. Once the focus of attention has been determined, control continues to step S300.

In step S300, the display events are determined. Display events are typically used to direct the attention of a user to some required action, alert the user to changes in system status or to indicate additional information. In various exemplary embodiments, display events may form part of an exploration or visualization tool, an operating system help function and/or may be integrated directly into an application. For example, the spreadsheet constraint graph visualization techniques disclosed in U.S. Pat. No. 6,185,582 to Zellweger et al., and U.S. Pat. No. 6,256,649 to Mackinlay et al. disclose the use of display events in a spreadsheet application environment. Display events may also be associated with pop-up windows or dialog boxes generated by applications to alert the user to additional information. After the display events vying for attention are determined, control continues to step S400.

The location of the display events are determined in step S400. Display events may be located at the focus of attention. If display events are presented on a very large visual display system at the visual focus of attention, conventional visual display techniques of color, detail and the like may be used to shift attention to the additional information. However, if display events are presented at the edge of a large visual display system, the display events are more likely to lie within the visual periphery of attention associated with peripheral vision. Peripheral vision is more sensitive to motion but is less acute and less sensitive to color than foveal vision. Conventional foveal based attention shifting display techniques do not work well for display events located at the periphery of attention. Therefore, if attention is to be shifted to visual display events lying at the periphery of attention, display attributes associated with the periphery of attention are used. Since peripheral vision is sensitive to motion, attention shifting display elements at the visual periphery of attention are associated with varying degrees of motion, animation and other movement based display attributes. This allows the user to be informed of the availability of additional information by the attention shifting display elements. However, the high cognitive overhead associated with involuntary refocusing of attention is avoided. After the location of the display events have been determined, control continues to optional step S500.

In optional step S500, the display event priorities are determined. Even though a display event presents at the periphery of attention, the display event may require a quicker response than a display event appearing in the focus of attention. For example, a modal dialog box appearing in a window at the visual periphery of attention on a very large display may indicate that processing has stopped due to an error and will not continue until a response is received. In various other exemplary embodiments according to this invention, attention shifting display elements associated with simultaneously appearing display events are ordered based on the priority of the display event. After the optional display event priorities are determined, control continues to step S600 where the distance between the location of the display events and the focus of attention is determined.

In wideband display systems, such as the wideband display systems disclosed in co-pending, co-assigned application Ser. No. 10/687,486, to Mackinlay et al., the distance between opposing edges of the wideband display may be quite large. A fluid spreadsheet animation of the constraint graph for a selected cell in a wideband spreadsheet display is likely to cover a long distance. Moreover, animations of this type are designed to minimize intrusiveness by completing within a second. Therefore, as the size of the wideband display increases, the animation path also increases. This results in faster animations that become increasingly difficult for the user to detect. To identify these long animation paths, the distance between the location of the display events and the focus of attention is determined. In various exemplary embodiments according to this invention, the distance is determined based on extrapolations of physical dimensions of the display system. For example, if three 25 inch or 63.5 centimeter displays are integrated into a composite wideband display, the physical width of the integrated wideband display is based on the sum of each display width and the sum of the width of each seam between the first-second and second-third displays respectively. Once the distance between the focus of attention and the location of the display event is determined, control continues to step S700.

In step S700, attention shifting display elements are determined based on the display event, the location of the display events, the optional display event priorities and the determined distance between the display events and the focus of attention. For example, if a display event occurs at the focus of attention, the determined attention shifting display element may include fovea sensitive color changes to indicate interrelationships. In contrast, if the display element occurs at the visual periphery of attention, a motion-based attention shifting display element may be determined.

It will be apparent that display events located at increasing distances from the focus of attention are more likely to be overlooked. Thus, in various other exemplary embodiments according to this invention, the increased distance of a display event from the focus of attention may be associated with an increase in an attention attracting attribute associated with the attention shifting display element. It will be apparent that the size of the animation block, the frequency of the flashing or blinking or any other method of increasing attentiveness to a display element may be used in the practice of this invention.

It will also be apparent that different attention shifting display elements may be displayed depending on the distance determined between the display events and the focus of attention. Display events occurring at the edge of a large display system may be located at a great distance from the focus of attention. Display events such as animations may not be easily noticed since they tend to complete in under a second. Therefore, dynamic and static attention shifting display elements may be combined to provide a combined attention shifting display element that fuses the animation frames over the animation path. For example, in various exemplary embodiments according to this invention, a thin line over a long animation path helps to align the animation blocks into a static frame that is more easily followed across the animation path. After the attention shifting display element is determined, control continues to step S800 and the process ends.

Figure 5:
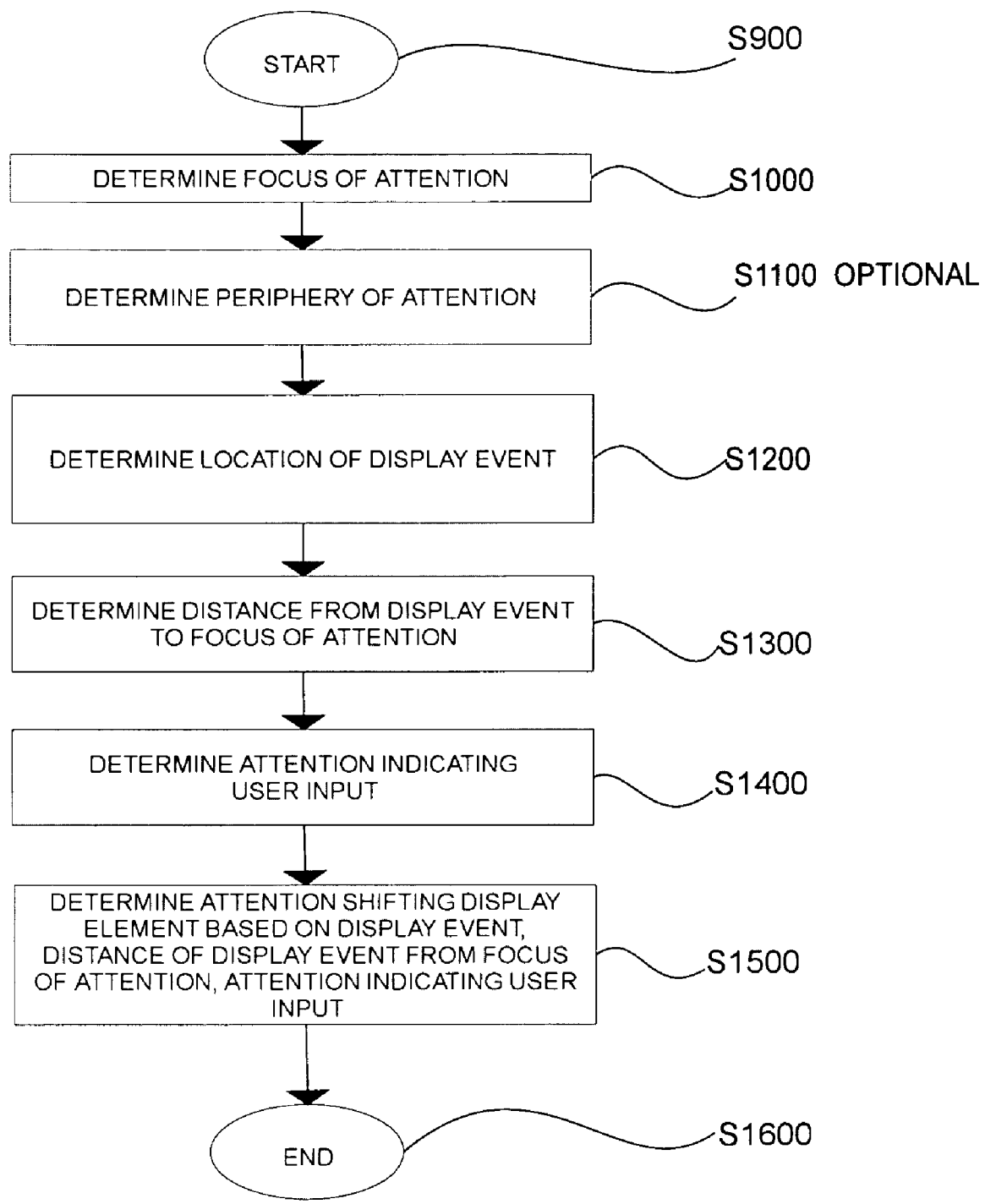
FIG. 5 is a flowchart of a second exemplary method of attention shifting according to this invention.

FIG. 5 is a flowchart of a second exemplary method of attention shifting according to this invention. The process begins at step S900 and immediately continues to step S1000.

In step S1000, the focus of attention for a sense is determined. In various exemplary embodiments according to this invention, the visual focus of attention is determined by tracking eye-movements. In various other exemplary embodiments according to this invention, head-movements are used to track an auditory focus of attention and finger position tracking may be used to track a tactile focus of attention. However, it will be apparent that any known or later developed method of determining a focus of attention may also be used in the practice of this invention. Moreover, foci of attention based on vision, touch, sound, taste, smell or any other human sensible characteristic may be used without departing from the scope of this invention. After the focus of attention has been determined, control continues to step S1100 where the periphery of attention is determined.

The perceptual field for a sense is composed of the focus of attention and the periphery of attention. Different senses may each be associated with different perceptual fields, foci of attention and peripheries of attention. For example, human eyes have a central visual or foveal area associated with high visual acuity and sensitivity to color. Humans tend to align the foveal portion of vision with the cognitive focus of attention. Peripheral vision is associated with sensitivity to motion. Peripheral vision may thus provide candidate display events or candidate foci of attention. The cognitive focus of attention is made aware of candidate foci of attention appearing at the periphery through peripheral vision. Events determined to be of sufficient interest or sufficiently helpful to the current task become the new visual focus of attention as well as the new cognitive focus of attention. Thus, for effective use of the communication channel at the periphery of attention, display events appearing at the periphery of attention should facilitate the user's information sampling or browsing.

Cognitive overhead is induced when display events are presented with display attributes that do not match the physical characteristics of the sense at that location. However, if the focus of attention is tracked, appropriate focal and peripheral attention shifting display elements may be determined based on a mapping of the sense characteristics to the display system. Thus, for display events at the periphery of attention, the distance from the focus of attention is used to determine the degree of attention attractiveness necessary to shift attention to the display event. In various exemplary embodiments according to this invention, flashing of oversized attention shifting display elements are used to shift attention to display events at the extreme periphery of attention. Progressively smaller and less attention attracting attention shifting display elements are displayed closer to the focus of attention. Since the display characteristics of the attention shifting display elements are matched to the physical responses of the senses, users are provided access to an increased flow of information with less intrusiveness and consequently lower cognitive overhead. After the periphery of attention for the sense is determined, control continues to step S1200.

In step S1200, the location of the display event is determined. The display event may be located close to the focus of attention or at a large distance from the focus of attention. In various exemplary embodiments, the location of the display event is determined based on information from the co-ordinates used by the display system to display the event. Once the location of the display event is determined, control continues to step S1300 where the distance from the display event to the focus of attention is determined.

The distance from the display event to the focus of attention may be determined based on information provided by the display system and extrapolated to a physical location relative to the focus of attention. As discussed above, the focus of attention may be determined based on user input, head tracking, eye tracking or any other known or later developed method of determining a focus of attention.

The distance of the display event from the focus of attention is used to determine the attention shifting display element. For example, in one exemplary embodiment according to this invention, the focus of attention may be directed to the left edge of the display system while the display event is located four meters away at the right edge of the display system. The dynamic attention shifting display element may be determined based on the proximity of the display event to the focus of attention. In various exemplary embodiments according to this invention, a dynamic attention shifting display element may be determined and displayed if the display event is outside the focus of attention. If the display event is located within centimeters of the focus of attention, a static attention shifting display element may be displayed. It will be apparent that since saccadic and/or head movements facilitate the sampling of information at the distal end of the attention shifting display elements, outside the focus of attention, static attention shifting display elements may also be displayed at or near the distal end of attention shifting display elements, at or near the display event or at any other location easily browsed or sampled by the user, without departing from the scope of this invention. Once the distance from the display event to the focus of attention is determined, control continues to step S1400 where the user input associated with the attention shifting display element is determined.

A continued focus of attention on an attention shifting display element may be inferred from a continuous stream of mouse down events for a period exceeding a threshold time period. However, as discussed above it will be apparent that any known or later developed method of determining the focus of attention may be used in the practice of this invention. After user input associated with the attention shifting display element is determined, control continues to step S1500.

In step S1500, an attention shifting display element is determined based on the display event, the distance of the display event from the focus of attention and the user input associated with the attention shifting display element. For example, if a user selects a formula cell within a spreadsheet using a mouse down action, an attention shifting display element dynamically indicates associated input cells based on the constraint graph for the selected spreadsheet cell. If the focus of attention directed towards the attention shifting display element exceeds a threshold time, a static attention shifting display element is displayed. In various exemplary embodiments according to this invention, the static attention shifting display element is a static and/or combination of static and dynamic attention shifting display elements. The static attention shifting display element facilitates a detailed review of the inputs to the selected spreadsheet cell while the mouse button is held down. When the focus of attention shifts, as indicated by the release of the mouse button or some other event, the display of the static attention shifting display element ends. This facilitates transitions between cursory review and detailed study. After the attention shifting display element is determined and displayed in step S11500, control continues to step S1600 where the process ends.

Figure 6:
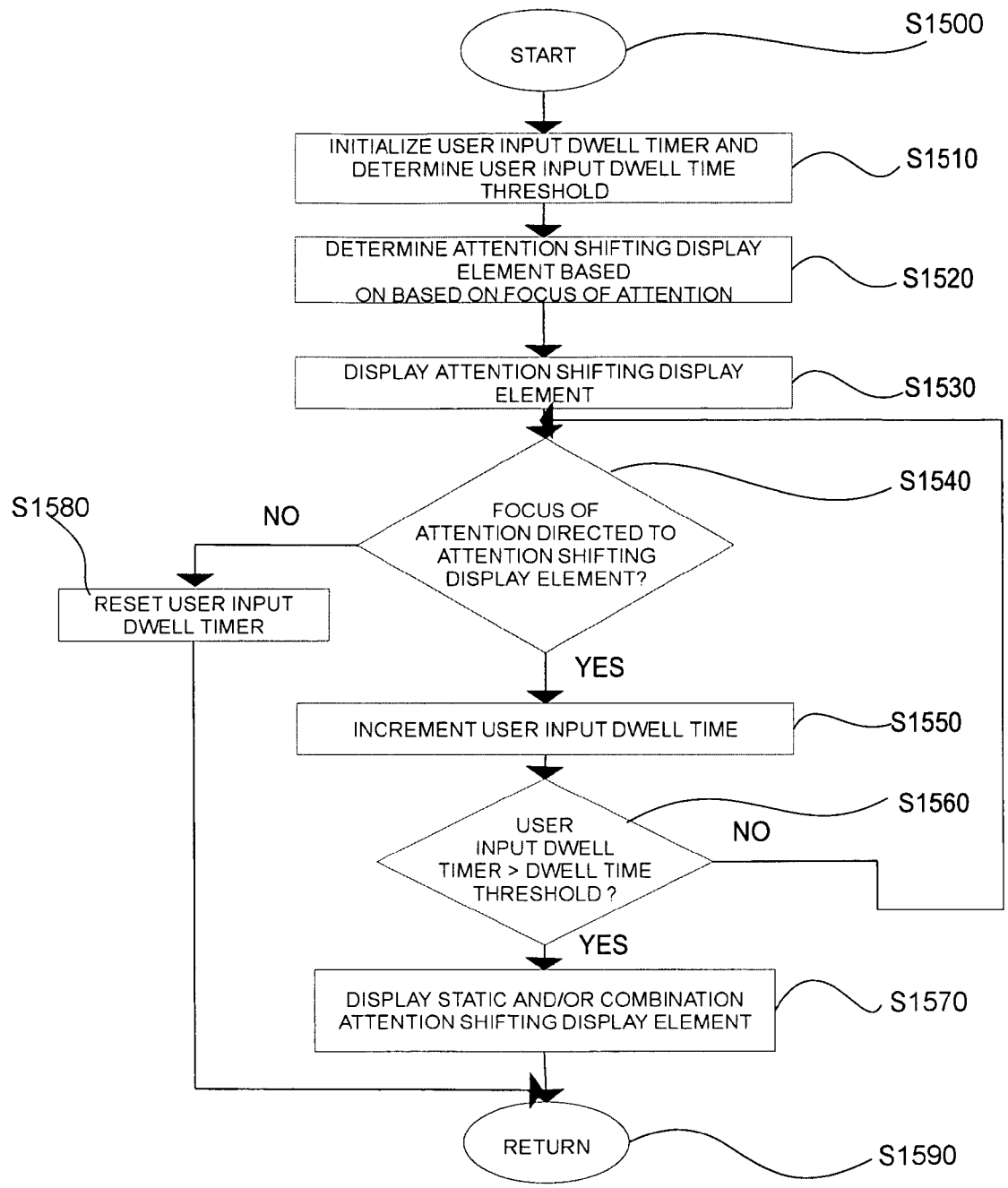
FIG. 6 is an expanded flowchart of an exemplary method of displaying an attention shifting display element according to this invention.

FIG. 6 is an expanded flowchart of an exemplary method of displaying an attention shifting display element according to this invention. The process begins at step S1500 and immediately continues to step S1510.

In step S1520, the user dwell time threshold is determined and the user input dwell timer is initialized. In various embodiments according to this invention, a user input dwell timer is started each time the focus of attention is directed towards a display event and/or display element and is reset when the focus shifts away. The user input dwell time threshold determines how long the focus of attention must dwell or remain on an attention shifting display element before triggering the display of first information such as other attention shifting display elements, static attention shifting display elements and the like. It will be apparent however that any number of additional user input dwell time thresholds may be associated with additional information without departing from the scope of this invention. Thus, in various other exemplary embodiments according to this invention, second, third and subsequent user input dwell time thresholds, second, third and subsequent mouse clicks or any other user event or sequence of user events may be associated with second, third and subsequent attention shifting display elements.

An attention shifting display element is determined based on the focus of attention in step S1520. The attention shifting display element may use dynamic or static attention shifting display elements to direct attention. In various exemplary embodiments according to this invention, display attributes associated with the attention shifting display element are dynamically determined based on the distance between the display event and the current focus of attention.

The distance between the location of the display event and the current focus of attention may also be used to determine the attention shifting display element. For example, in order to be noticed, display events at the edge of a visual periphery of attention may require an attention shifting display element having more attention attracting visual motion. Once the attention shifting display element is determined, control continues to step S1530 where the attention shifting display element is displayed. Control then continues to step S1540.

In step S1540, a determination is made as to whether the focus of attention is directed towards the attention shifting display element. If it is determined that the focus of attention has shifted from the attention shifting display element, then control continues to step S1580 where the user input dwell timer is reset. Control then continues to step S1590, returns to step S1000 of FIG. 5 and continues to step S1100. Otherwise, if it is determined that the focus of attention remains fixed on the attention shifting display element, control continues to step S1550 where the user input dwell timer is incremented.

The user input dwell timer indicates how long the focus of attention had been directed at the attention shifting display element. The user input dwell timer may use any known or later developed method of timing the focus of attention on an object or region, without departing from the scope of this invention. After the user input dwell timer has been incremented, control continues to step S1560.

In step S1560, a determination is made whether the value of the user input dwell timer is greater than the dwell time threshold. If it is determined that the value of the user input dwell timer does not exceed the dwell time threshold, then control jumps to step S1540. Steps S1540-S1560 are repeated until either: 1) the value of the user input dwell timer exceeds the dwell time threshold; or 2) the focus of attention shifts from the attention shifting display element.

If it is determined in step S1560 that the user input dwell timer exceeds the dwell time threshold value, control continues to step S1570 where a static attention shifting display element is displayed. For example, if the focus of attention is directed at the attention shifting display element associated with a mouse down action or the like, then the attention shifting display element may be dynamically changed to a static attention shifting display element. The display of a static attention shifting display element facilitates detailed review of the information presented. In one of the various exemplary embodiments according to this invention, dynamic attention shifting display elements may be used to provide a visualization of hidden dataflow dependencies and/or other inter-relationships without the high cognitive overhead associated with a forced re-focusing of attention. When it can be inferred that the focus of attention is directed at the dynamic attention shifting display element, the dynamic attention shifting display element may be changed to a static combination attention shifting display element suited to the detailed review of the information presented.

For example, if a user selects a cell in one of the fluid spreadsheets discussed above with a mouse down action, a dynamic animated display of the constraint graph associated with the selected spreadsheet cell is displayed. In various exemplary embodiments according to this invention, the dynamic animated display continues until the mouse button is released and mouse down events cease. Continued mouse down events exceeding a threshold value are used to infer that the focus of attention remains fixed on the attention shifting display element.

The continued focus of attention on the attention shifting display element is used to infer that additional information or detail may be useful to the user. Additional information may be provided by a static attention shifting display element that statically presents the information. The static attention shifting display element facilitates detailed review of constraint graphs and/or other information associated with the selected cell. It will be apparent that the use of continued mouse down events to infer the focus of attention is merely exemplary and that head tracking, eye tracking or any known or later developed method of determining the focus of attention may also be used without departing from the scope of this invention. It will also be apparent that any number of additional threshold values may be defined for mouse-down or any other user events and associated with additional information. For example, in various other exemplary embodiments according to this invention, progressively more detailed and/or specific additional information is displayed as progressively higher threshold values for a mouse-down user event are exceeded.

If the user follows a mouse down, focus of attention indicating event with an immediate mouse up event, the user input dwell timer will be reset without exceeding the dwell time threshold since the shift in the focus of attention is inferred to have been transitory. After the static attention shifting display element is displayed, control continues to step S1590. The process then returns to step S1500 of FIG. 5 and continues to step S1600.

Figure 7:
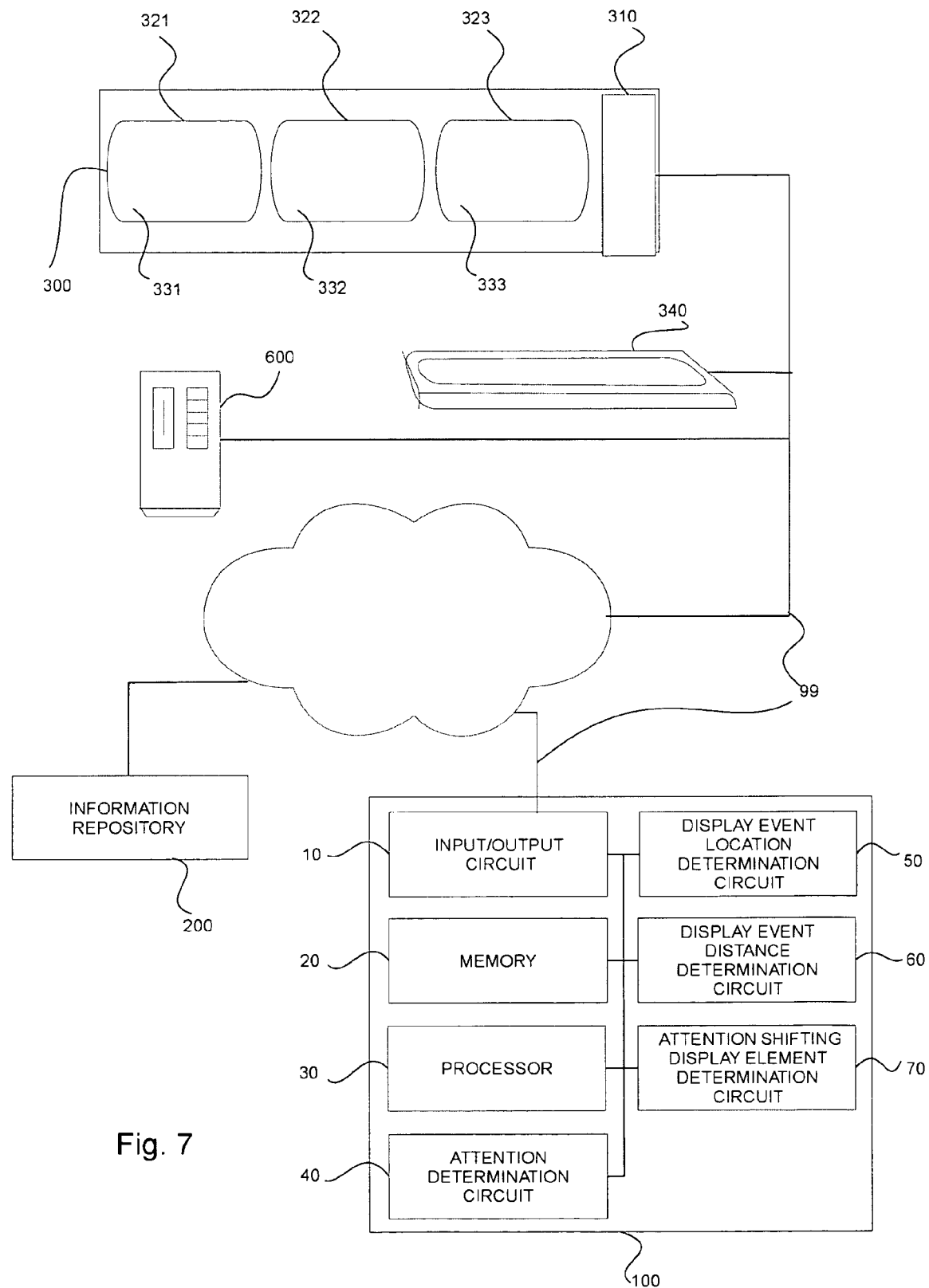
FIG. 7 is an exemplary attention shifting manager or system according to this invention.

FIG. 7 is an exemplary attention shifting manager or system 100 according to this invention. An e-paper based wideband display 300 is connectable to a keyboard input device 340, a personal computer 600, an attention shifting manager or system 100 and an information repository 200 via communications links 99.

The e-paper based wideband display 300 is comprised of a first e-paper display 321 having a first display area 331, a second e-paper display 322 having a second display area 332 and a third e-paper display 323 having a third display area 333 coordinated by controller 310.

The attention shifting manager or system 100 is comprised of: a memory 20; a processor 30; an attention determination circuit 40; a display event location determination circuit 50; an optional display event distance determination circuit 60; and an attention shifting display element determination circuit 70; each connectable via input/output circuit 10 to communication links 99.

A user of the e-paper based wideband display 300 enters a request for information from the information repository 200 onto keyboard 340 of personal computer 600. The personal computer 600 retrieves the requested information from information repository 200 over communications links 99. The attention shifting manager or system 100 mediates the display of the requested information on the e-paper based wideband display 300. For example, a fluid spreadsheet retrieved from information repository 200 is rendered by personal computer 600 across the e-paper based wideband display based on information from the attention shifting manager or system 100.

The input/output circuit 10 of the attention shifting manager or system 100 retrieves the display information and stores it in memory 20. The attention determination circuit 40 is activated to determine the focus of attention. The focus of attention may be based on a user selection, mouse positioning, eye tracking, head tracking or any other known or later developed method of determining the focus of attention. It will be apparent that the discussion of a visual focus of attention is merely exemplary and that the focus of attention associated with any one or more senses, such as touch, taste, sound and smell may also be used in the practice of this invention.

As each display event is determined and displayed on the wideband display 300, the display event location determination circuit 50 is activated to determine the display event location. The display event and the location of the display event information are used to determine the attention shifting display elements to display.

After the location of the display event is determined, the optional display event distance determination circuit 60 is activated to determine the distance between the determined location of the display event and the focus of attention. In a wideband display environment, the focus of attention may be directed at the left most edge of the first display area 331 of the e-paper based wideband display 300. A wideband fluid spreadsheet application may attempt to present a display event at the rightmost edge of the third display area of the e-paper based wide band display 300. In various exemplary embodiments according to this invention, the distance between the focus of attention and the location of the display event is extrapolated based on the physical properties of the e-paper based wideband display 300. However, it will be apparent that any known or later developed method of determining the display event distance may be used in the practice of this invention.

The attention shifting display element determination circuit 70 is then activated. For example, in one of the various exemplary embodiments according to this invention, if the display event is located outside of the focus of attention, a dynamic attention shifting display element is displayed. The dynamic attention shifting display element may be based on animation, or other movement or motion since these physical attributes are associated with peripheral vision. If the display event is located within the focus of attention, a static attention shifting display element may be used instead. Thus, for static attention shifting display elements, color, detail or any other visual attributes coinciding with the physical attributes of the fovea may be used.

It will be apparent that in still other exemplary embodiments according to this invention, the static and/or combination static and dynamic attention shifting display elements may be displayed at the ends of the attention shifting display elements distal to the focus of attention. Since the likely/candidate foci of attention may be quickly accessed using saccadic eye movements or slight head movements, the endpoints of the attention shifting display elements distal to the focus of attention are likely or candidate foci of attention. However, static attention shifting display elements may also be displayed at display event locations or any other likely or candidate focus of attention without departing from the scope of this invention.

In various other exemplary embodiments according to this invention, an ordering of the display events is used to prioritize the attention shifting user display elements presented to the user. For example, low priority display elements appearing at the periphery of a visual focus of attention may be associated with motion-based attention shifting display elements. In various other exemplary embodiments according to this invention, increased distance from the focus of attention increases an attention attracting display attribute associated with the attention shifting display element. For example, since a visual display element at the extreme edge of the visual periphery of attention will be difficult to notice, dynamic attention shifting display elements at these locations are associated with increased motion, animation, flashing and/or other attention attracting display attributes associated with peripheral vision. It will be apparent that in an auditory based environment, attention attracting display attributes may include the selection of increasingly intrusive tones and/or tonal patterns.

A static attention shifting display element is determined for display events occurring within the focus of attention. Static attention shifting display elements are associated with colors, detail and/or any known or later developed foveal display attributes.

In various other exemplary embodiments according to this invention, a priority associated with the display events is used to determine the attention shifting display element. For example, low priority static attention shifting display elements may use transitory or dynamic elements such as animations to help visualize information. If the focus of attention remains directed at the display event that triggered the display of the dynamic attention shifting display element, a higher priority may be assigned to the attention shifting display element. In response, the attention shifting display element may be dynamically changed from a dynamic attention shifting display element to a static or a combination attention shifting display element. For example, continued focus of attention on a cell in a fluid spreadsheet cell and user feedback may trigger a change from a dynamic/animated attention shifting display element to a static attention shifting display element that facilitates review of the information presented. Further continued focus of attention may trigger increasingly informative animated attention shifting display elements. For example, a first animated attention shifting display element may simultaneously shows the inputs for a spreadsheet cell and a second animated attention shifting display element directly following the first simultaneously show the outputs from the spreadsheet cell. Subsequent animated attention shifting display elements order the inputs and start overlapping animations for each input in order such that all inputs end before the output animations end.

In still other exemplary embodiments according to this invention, the distance between the location of the display event and the focus of attention is determined based on an extrapolation of the physical display properties and the properties of the wideband display. For example, an exemplary wideband display composed of three 600-centimeter wide displays having two 10-centimeter non-sensible seams has a total width of 1810 centimeters.

Figure 8:
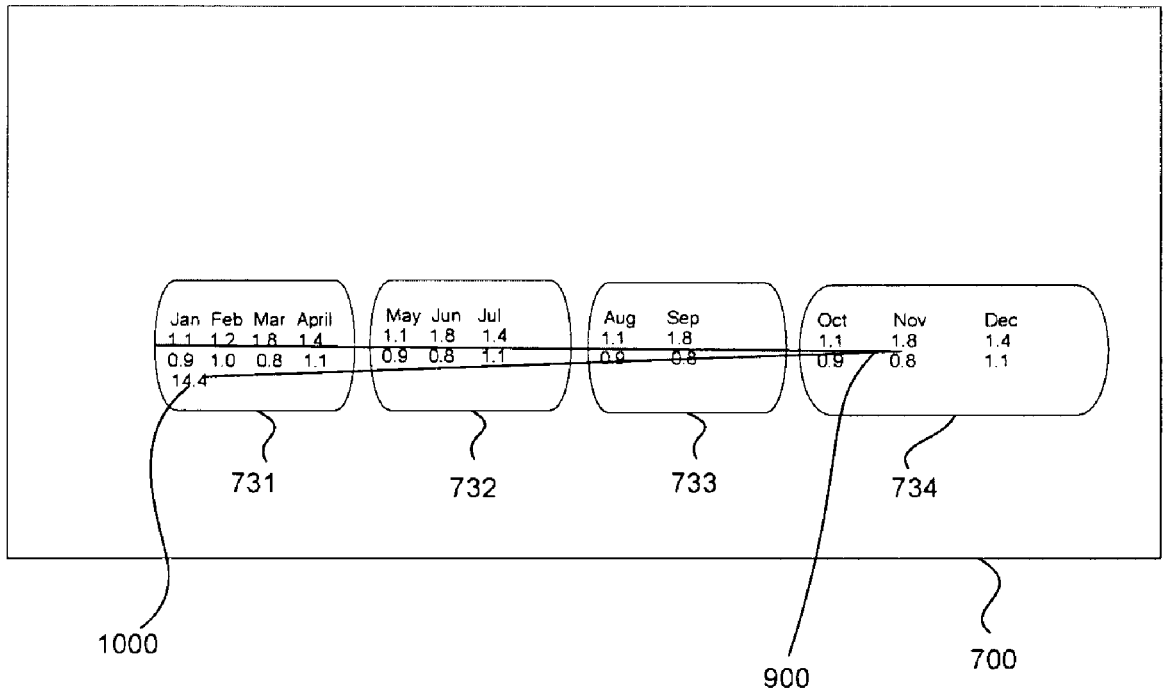
FIG. 8 is an overview of the display of an attention shifting display element on a wideband display according to one embodiment of this invention.

FIG. 8 is an overview of the display of an attention shifting display element 900 on a projection based wideband display 700 according to one embodiment of this invention. The projection based wideband display is comprised of first, second, third and fourth projected displays 731-734. The attention shifting display element 900 indicates that the first row of numbers for the months January through November serve as inputs to the resulting value of "14.4" shown in the selected cell 1000. The selected cell 1000 is a formula cell that operates on the numbers indicated by the attention shifting user interface element 900.

The attention shifting user interface element 900 provides a visualization of the constraint graph for the selected cell 1000. The visualization makes it easier to identify the fact that the formula mistakenly omits the month of December from the calculated yearly totals. Since the visualization spans the very large distance of the projection based wideband display 700, conventional fluid spreadsheet animations constrained to complete in less than a second would be difficult to follow and identify. Therefore, a frame fusing attention shifting display element is determined. The frame fusing attention shifting display element allows the animations to be followed across the larger distances of the wideband display while permitting the information to be dynamically displayed and removed within the one-second display interval.

In various exemplary embodiments according to this invention, a static attention shifting display element is displayed when a user shows continued interest in the information presented by the frame fusing attention shifting display element. The static attention shifting display element facilitates detailed review of the additional information presented.

Figure 9:
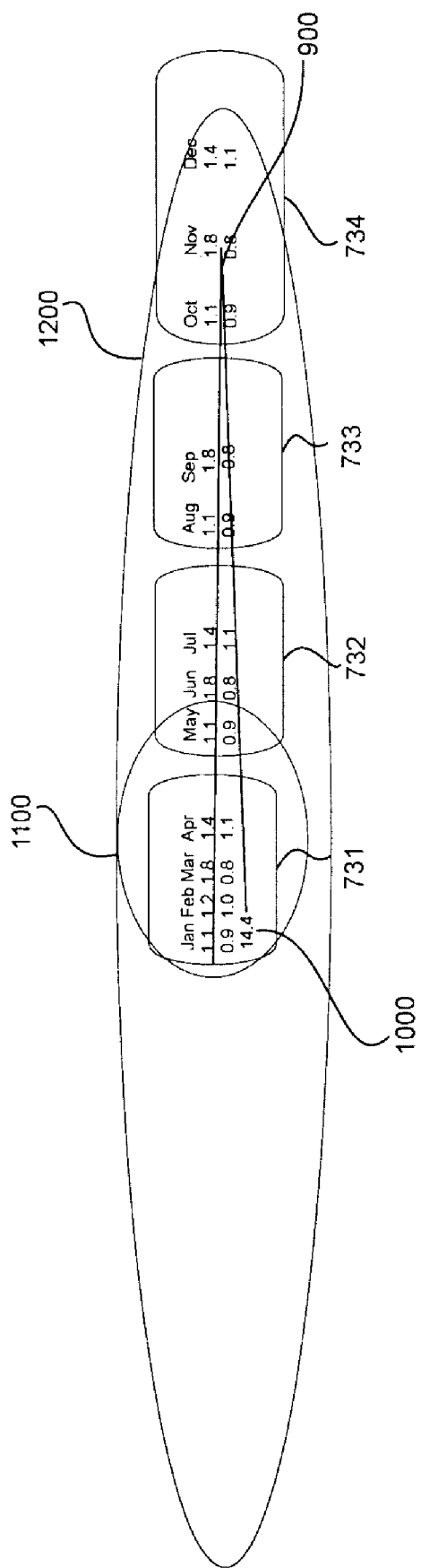
FIG. 9 is an overview showing an exemplary visual focus of attention and an exemplary visual periphery of attention.

FIG. 9 is an overview showing an exemplary visual focus of attention 1100 and an exemplary visual periphery of attention 1200 on a composite wideband display 700 comprised of first second, third and fourth display areas 731-734. The visual focus of attention 1100 is directed towards the first display area 731 while the visual periphery of attention 1200 includes the first, second, third and fourth display areas, 731-734 respectively.

A mouse down action in selected cell 1000 indicates that the cognitive focus of attention is likely directed towards the selected cell 1000. An application such as a fluid spreadsheet triggers a display event that animatedly displays the constraint graph for the selected cell 1000. However, since the physical distance across the wideband display 400 is 1810 centimeters, any animation designed to non-intrusively complete in less than a second will traverse the animation path very quickly. These quick animations over large distances are likely to be overlooked by users. If the attention shifting system determines that the display event is associated with an animation that occurs across a large portion of the wideband display, a fusing combined dynamic and static attention shifting display element may be displayed to provide a static visual framework while a dynamic attention shifting display element provides animation. This allows the animation to complete within the desired time while also ensuring that sufficient visual information is available to allow a user to easily follow the animation path. As discussed above, if the user shows sufficient interest in the dynamic and/or combined attention shifting display element, the dynamic attention shifting display element is dynamically changed to a static attention shifting display element that better facilitates detailed study and/or review.

For example, an attention shifting display element may use a combined dynamic and static attention shifting display element that allows the user to follow the information across the projection based wideband display 700. The attention shifting display element visually informs the user of the omission of December values from the yearly calculations. However, the intrusiveness of the attention shifting display elements is minimized since the display completes within a second. The attention shifting manager or system 100 suggests candidate foci of attention portions of a display for the user's review without specifically re-directing the user's attention. In this way, increased information flow between the user and the system is enabled while minimizing the cognitive overhead typically associated with increasing the flow of information.

Figure 10:
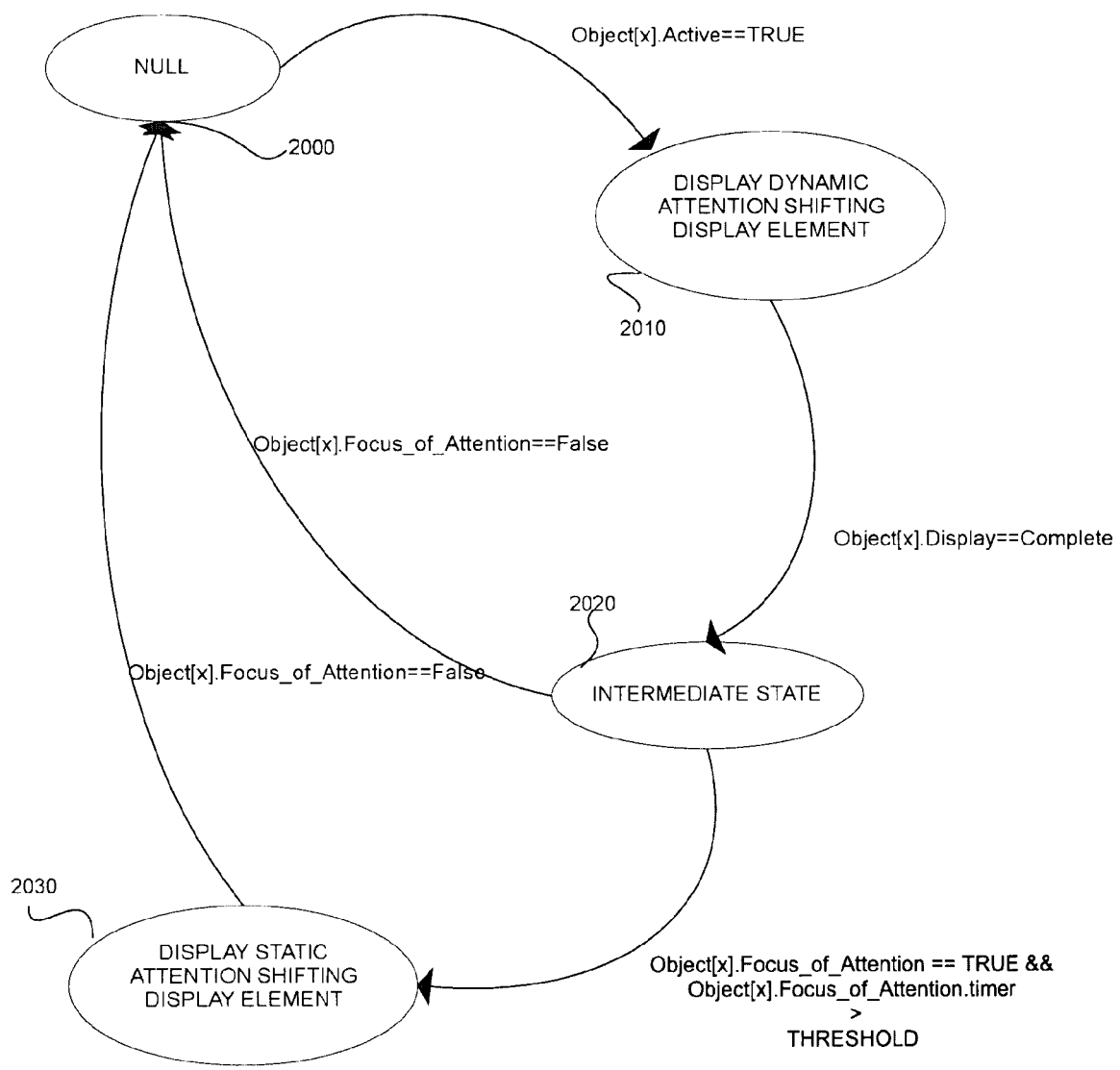
FIG. 10 is a state diagram of an exemplary method of displaying attention shifting display elements according to this invention.

FIG. 10 is a state diagram of an exemplary method of displaying attention shifting display elements according to this invention. When a display event is determined to be active, the system transitions from the initial null state 2000 to a state for displaying the dynamic attention shifting display element 2010. The state for displaying the dynamic attention shifting display element 2010 is associated with the transient display of the information associated with the selected item.

In various exemplary embodiments according to this invention, minimally intrusive animations are used that complete in less than a second. These minimally intrusive animations inform the user of the availability of additional information using display attributes associated with the visual periphery of attention. Thus, cognitive load is not significantly increased while the additional visual communication bandwidth of the visual periphery of attention is used. Moreover, since a user is merely informed of candidate foci of attention, the overhead associated with task switching is avoided. Instead, information sampling or browsing by the user is facilitated by the systems and methods of this invention.

Animation paths that cover a large portion of a wideband display must occur quickly if the animation is to complete in less than a second. The larger the display, the more quickly the animation must occur. As the speed of the animations increases based on the increasing distances of the wideband display, the animations become less noticeable. Therefore, to allow the animations to be followed across the increasing distances of wideband displays, a static attention shifting display element is determined based on the location of the display events, the focus of attention and the animation path distance. The static attention shifting display element allows the animation to be followed across the large distances of the wideband display. For example, in various exemplary embodiments according to this invention, a frame fusing static attention shifting display element, such as a line, overlaps the animation frames during the animation. The line of the frame fusing attention shifting display element allows the user to follow the faster animations that occur on wideband displays.

After the dynamic attention shifting display element has been displayed, the system transitions to an intermediate state 2020. If the focus of attention remains fixed on the attention shifting display element or the display event that triggered the display of the dynamic attention shifting display element, the system transitions to a static attention shifting display element display state 2030. Otherwise, when the display event and/or attention shifting display element is no longer within the focus of attention, the system transitions to the null state 2000.

If the system transitions to the static attention shifting display element display state 2030, a detailed view of the information is provided. For example, an indicator showing each of the spreadsheet cells affected by the selected cell may be statically displayed. The static display facilitates detailed review of the information presented. Once the system determines the focus of attention has shifted from the display event and/or the static attention shifting display element, a state transition to the null state 2000 occurs.

Figure 11:
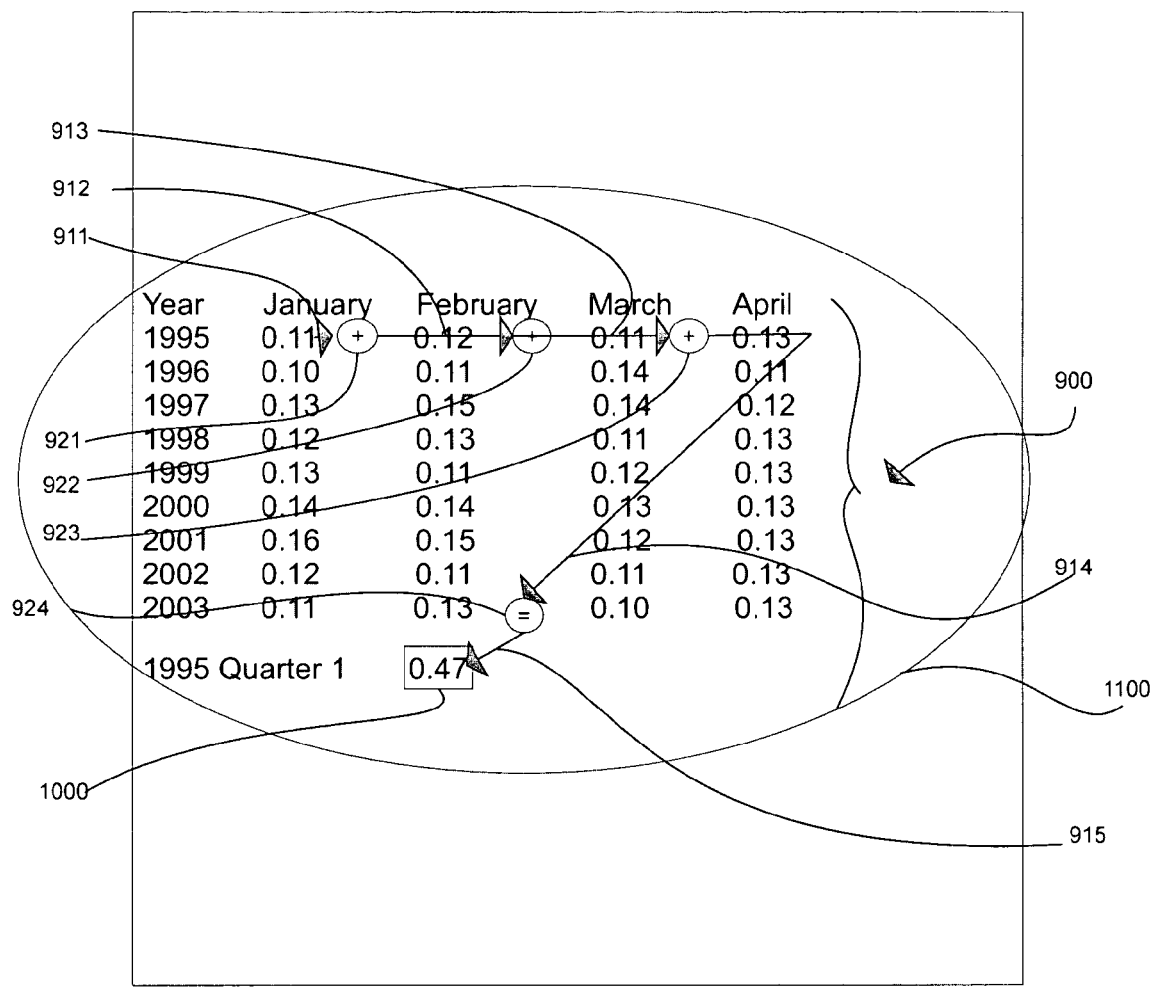
FIG. 11 is a first exemplary attention shifting display element according to this invention.

FIG. 11 is a first exemplary attention shifting display element 900 according to this invention. The selected cell 1000 lies within the focus of attention 1100. The attention shifting display element 900 is comprised of exemplary first, second, third, fourth and fifth attention directing portions 911-915. In a spreadsheet environment, the attention directing portions 911-915 can be used to inform the user of the sequence in which calculations are performed. The first, second and third attention directing portions 911-913 point to first, second, third and fourth information portions 921-924. The information portions 921-924 can be used to inform the user of the type of calculation performed, or provide other types of relevant information. For example, the first, second and third information portions 921-923 are associated with a "+" sign indicating that the respective cells are added together. The fourth information portion 924 is associated with the "=" sign indicating the selected cell 1000 receives the result of the indicated cells. For example, the exemplary attention shifting display element 900 facilitates the discovery that an extra month has been erroneously included into the quarterly totals. It will be apparent that in various exemplary embodiments, the quarterly or larger yearly totals may include information in columns extending beyond the focus of attention.

Figure 12:
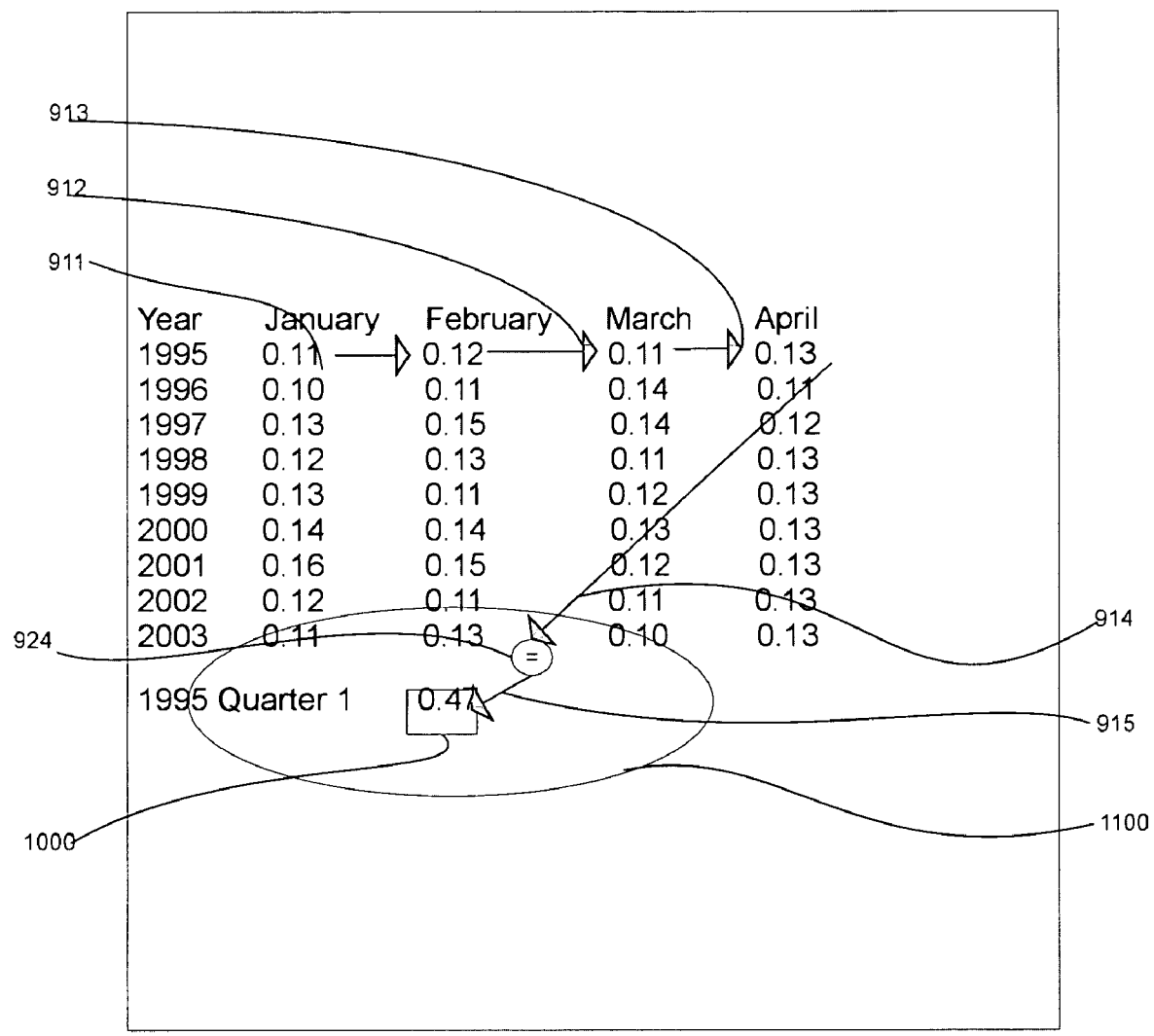
FIG. 12 is a second exemplary attention shifting display element according to this invention.

FIG. 12 is a second exemplary attention shifting display element according to this invention. The selected cell 1000 lies within the visual focus of attention 1100. For example, if the spreadsheet is enlarged, information that was previously within the focus of attention may be pushed to the periphery of attention.

The attention shifting user interface element 900 is comprised of exemplary first, second, third fourth and fifth attention directing portions 911-915. The attention directing portions 911-915 inform the user of the direction and scope of the selected cell. An information portion 924 containing a "=" indicator is displayed within the focus of attention 1100. The "=" information portion 924 provides static context that informs the user of the relevance of information provided at the periphery of attention. If the user determines the additional information is salient, quick eye and/or head movements are made to quickly capture further details from the peripheral communication channel.

Each of the circuits 10-70 of the attention shifting manager or system 100 outlined above can be implemented as portions of a suitably programmed general-purpose computer. Alternatively, 10-70 of the attention shifting manager or system 100 outlined above can be implemented as physically distinct hardware circuits within an ASIC, or using a FPGA, a PDL, a PLA or a PAL, or using discrete logic elements or discrete circuit elements. The particular form each of the circuits 10-70 of the attention shifting manager or system 100 outlined above will take is a design choice and will be obvious and predicable to those skilled in the art.

Moreover, the attention shifting manager or system 100 and/or each of the various circuits discussed above can each be implemented as software routines, managers or objects executing on a programmed general purpose computer, a special purpose computer, a microprocessor or the like. In this case, attention shifting manager or system 100 and/or each of the various circuits discussed above can each be implemented as one or more routines embedded in the communications network, as a resource residing on a server, or the like. The attention shifting manager or system 100 and the various circuits discussed above can also be implemented by physically incorporating the attention shifting manager or system 100 into a software and/or hardware system, such as the hardware and software systems of a web server or a client device.

As shown in FIG. 7, memory 20 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1-3 and 7 can each be any known or later developed device or system for connecting a communication device to the attention shifting manager or system 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be a wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of shifting attention comprising the steps of:
   determining the location for a focus of attention;
   determining a display event;
   determining the location of the display event;
   determining an attention shifting display element based on the display event, the determined location of the display event and the focus of attention; and
   determining a distance between the focus of attention and the display event;
   wherein the attention shifting display element is determined based on the determined distance, such that different types of attention shifting display elements are determined for different distances.

2. The method of claim 1, wherein the focus of attention is determined based on at least one of: monitoring user actions and monitoring user activity.

3. The method of claim 2 wherein user actions are monitored based on at least one of eye-tracking, head tracking, arm tracking, user selection tracking, video information, audio information and gestures.

4. The method of claim 1, wherein the display event is associated with at least one of animated information, static information and help information.

5. The method of claim 1, wherein the focus of attention is located on a first display and the display event is located on a second display.

6. The method of claim 1, wherein the distance between the focus of attention and display event includes at least one non-sensible portion.

7. The method of claim 5, wherein the distance between the focus of attention and the display event includes at least one non-sensible portion.

8. The method of claim 1, wherein determining the attention shifting display element comprises the steps of:
   determining a dynamic attention shifting display element based on a display event located at the periphery of attention; and
   determining a static attention shifting display element based on a display event located at the focus of attention.

9. The method of claim 1, wherein determining the attention shifting display element comprises determining a combination attention shifting display element based on a display event located more than a threshold distance from the focus of attention.

10. The method of claim 8, wherein the focus of attention is located on a first display and the display event is located on a second display.

11. A method of determining an attention shifting display element comprising the steps of:
    determining a focus of attention;
    determining a location of a display event;
    determining an attention directing portion of an attention shifting display element based on a distance between the focus of attention and the location of the display event, such that different types of attention shifting display elements are determined for different distances.

12. The method of claim 11, further comprising determining an attention attracting portion of an attention shifting display element based on the distance between the location of the display event and the location of the focus of attention.

13. The method of claim 11, further comprising determining at least one information portion within the focus of attention, associated with the attention shifting display element, and where the information portion displays information associated with the display event.

14. The method of claim 13, where the information portion is at least one of: a mathematical operator and a symbolic operator.

15. The method of claim 11, where the attention shifting display element is dynamically determined based on continued focus of attention on a display region.

16. The method of claim 15, where the continued focus of attention is determined based on user monitoring.

17. The method of claim 11, where the attention shifting display element is dynamically determined based on continued focus of attention on the display event and wherein the display event is based on at least one of: a mouse event; a keyboard event and exceeding a threshold time.

18. A system of shifting attention comprising:
    an input/output circuit for receiving a display event information;
    a memory;
    a processor;
    an attention determination circuit that determines a focus of attention;
    a display event location determination circuit that determines the location of the display event;
    an attention shifting display element determination circuit that determines an attention shifting display element based on the display event information, the location of the display event and the location of the focus of attention; and a distance determination circuit that determines the distance between the focus of attention and the display event, wherein the attention shifting display element is determined based the determined distance, such that different types of attention shifting display elements are determined for different distances.

19. The system of claim 18, where the focus of attention is determined based on at least one of: monitoring user actions and monitoring user activity.

20. The system of claim 19 where the user actions are monitored based on at least one of eye-tracking, head tracking, arm tracking, user selection tracking, video information, audio information and gestures.

21. The system of claim 18, where the display event is at least one of animated information, static information and a help message.

22. The system of claim 18, wherein the focus of attention is located on a first display and the display event is located on a second display.

23. The system of claim 18, where the distance between the focus of attention and display event includes at least one non-sensible portion.

24. The system of claim 22, where the distance between the focus of attention and the display event includes at least one non-sensible portion.

25. The system of claim 18, where determining the attention shifting display element comprises the steps of:
  determining a dynamic attention shifting display elements based on a display event located at the periphery of attention; and
  determining a static attention shifting display element based on a display event located at the focus of attention.

26. The system of claim 18, where determining the attention shifting display element comprises determining a fusing attention shifting display element based on a display event located more than a threshold distance from the focus of attention.

27. The system of claim 25, wherein the focus of attention is located on a first display and the display event is located on a second display.

28. A system of determining an attention shifting display element comprising:
  an attention determination circuit that determines the focus of attention;
  a display event location circuit that determines the location of the display event; and
  an attention directing indicator circuit that determines an attention directing portion of an attention shifting display event based on a distance between the focus of attention and the location of the display event, such that different types of attention shifting display elements are determined for different distances.

29. The system of claim 28, further comprising the step of determining an attention attracting portion of the attention shifting display element based on the distance between the location of the display event and the location of the attention.

30. The system of claim 28, further comprising the step of determining at least one static information portion within the focus of attention associated with the attention shifting display element, and where the static information portion displays information associated with the display event.

31. The system of claim 30, where the information portion is at least one of: a mathematical operator and a symbolic operator.

32. The system of claim 28, where the attention shifting display element is dynamically determined based on continued focus of attention on the display event.

33. The system of claim 32, where the continued focus of attention is based on user monitoring.

34. The system of claim 28, wherein the continued focus of attention on a display event is based on at least one of: a mouse event; a keyboard event, exceeding a threshold time.

35. A non-transitory computer readable storage medium comprising: computer readable program code embodied on the non-transitory computer readable storage medium, the computer readable program code usable to program a computer for shifting attention comprising the steps of:
  determining the location for a focus of attention;
  determining an display event;
  determining the location of the display event;
  determining an attention shifting display element based on the display event, and the determined location of the display event; and
  determining a distance between the focus of attention and the display event;
  wherein the attention shifting display element is determined based on the determined distance, such that different types of attention shifting display elements are determined for different distances.

36. A means of shifting attention comprising:
  means for determining the location for a focus of attention;
  means for determining a display event;
  means for determining the location of the display event; and
  means for determining an attention shifting display element based on the display event, the determined location of the display event and the focus of attention; and
  means for determining a distance between the focus of attention and the display event;
  wherein the attention shifting display element is determined based on the determined distance, such that different types of attention shifting display elements are determined for different distances.

37. A means of determining an attention shifting display element comprising:
  means for determining a focus of attention;
  means for determining a location of a display event;
  means for determining an attention directing portion of an attention shifting display element based on a distance between the focus of attention and the location of the display event, such that different types of attention shifting display elements are determined for different distances.

38. The method of claim 1, wherein the attention shifting display element is determined based on the location of the display event and the determined distance.

39. The method of claim 11, wherein the attention directing portion is determined based on the location of the display event and the determined distance.

40. The system of claim 18, wherein the attention shifting display element is determined based on the location of the display event and the determined distance.

41. The system of claim 28, wherein the attention directing portion is determined based on the location of the display event and the determined distance.

42. The non-transitory computer readable storage medium of claim 35, wherein the attention shifting display element is determined based on the location of the display event and the determined distance.

43. The means for shifting of claim 36, wherein the attention shifting display element is determined based on the location of the display event and the determined distance.

44. The means for shifting of claim 37, wherein the attention directing portion is determined based on the location of the display event and the determined distance.

* * * * *